(12) United States Patent
Kiser et al.

(10) Patent No.: US 9,826,672 B1
(45) Date of Patent: Nov. 28, 2017

(54) IMPLEMENT AND METHOD FOR PREPARING AND MAINTAINING DIRT ARENA FOOTING

(71) Applicant: Absolute Innovations, Inc., Osceoloa, IN (US)

(72) Inventors: Robert D. Kiser, Gainesville, TX (US); Kevin V. Keigley, Osceola, IN (US)

(73) Assignee: ABI Attachments, Inc., Mishawaka, IN (US)

( * ) Notice: Subject to any disclaimer, the term of this patent is extended or adjusted under 35 U.S.C. 154(b) by 238 days.

(21) Appl. No.: 14/571,334

(22) Filed: Dec. 16, 2014

Related U.S. Application Data

(63) Continuation of application No. 13/158,760, filed on Jun. 13, 2011, now Pat. No. 8,944,176, which is a continuation-in-part of application No. 12/248,974, filed on Oct. 10, 2008, now abandoned, and a continuation of application No. 11/539,065, filed on Oct. 5, 2006, now abandoned, and a continuation of application No. 11/445,500, filed on Jun. 1, 2006, now abandoned.

(60) Provisional application No. 60/978,869, filed on Oct. 10, 2007.

(51) Int. Cl.
*A01B 79/00* (2006.01)
*A01B 45/00* (2006.01)
*A01B 59/043* (2006.01)
*A01B 63/24* (2006.01)
*A01B 49/02* (2006.01)

(52) U.S. Cl.
CPC .............. *A01B 45/00* (2013.01); *A01B 49/02* (2013.01); *A01B 59/043* (2013.01); *A01B 63/24* (2013.01); *A01B 79/00* (2013.01)

(58) Field of Classification Search
CPC ................................ A01B 49/02; A01B 31/00
USPC .................................................. 172/195, 199
See application file for complete search history.

(56) References Cited

U.S. PATENT DOCUMENTS

| | | |
|---|---|---|
| 599,093 A | 2/1898 | Beam |
| 1,135,755 A | 3/1915 | Benge |
| 1,333,854 A | 3/1920 | Kuker |
| 1,365,037 A | 1/1921 | Johnson |
| 1,463,106 A * | 7/1923 | Weber .................... A01B 45/04 172/19 |
| 1,645,994 A | 10/1927 | Lloyd |

(Continued)

*Primary Examiner* — Thomas B Will
*Assistant Examiner* — Joel F. Mitchell
(74) *Attorney, Agent, or Firm* — Taft Stettinius & Hollister LLP

(57) ABSTRACT

An implement is disclosed for smoothing grounds that include at least a compact base having a top surface and a lesser compact footing on top of the base. The implement includes a frame having a front portion, a central portion, a rear portion, and a width. Wheels are mounted for rotation directly to the frame, and tools are carried by the frame for engagement with the ground. The tools include a specially shaped cleaving blade connected to the rear portion of the frame by a tool support, which securely connects the cleaving blade at predetermined heights. The blade has a front shaving edge and a rear compressing edge. The blade extends straight across the width of the frame so as to maximize the drag displaced on the frame during use of the blade. Arrangement of the wheels directly on the frame provides optimal stabilization of the frame during operation of the blade.

8 Claims, 4 Drawing Sheets

(56) References Cited

U.S. PATENT DOCUMENTS

| | | | |
|---|---|---|---|
| 1,856,148 A | 6/1931 | Ball | |
| 2,047,310 A | 7/1936 | Cohea et al. | |
| 2,186,658 A | 1/1940 | Scheunemann | |
| 2,187,833 A | 1/1940 | Lock et al. | |
| 2,197,429 A | 4/1940 | Graham et al. | |
| 2,566,562 A | 9/1951 | Hale | |
| 2,657,652 A | 11/1953 | Graham | |
| 2,703,044 A | 3/1955 | Adair | |
| 2,736,252 A | 2/1956 | Latshaw | |
| 2,774,155 A | 12/1956 | Hipp | |
| 3,048,229 A * | 8/1962 | Simpson | A01B 39/06 172/698 |
| 3,058,243 A | 10/1962 | McGee | |
| 3,101,794 A * | 8/1963 | Bechman | A01B 35/14 172/698 |
| 3,129,773 A | 4/1964 | Freeman | |
| 3,225,839 A | 12/1965 | Petitt | |
| 3,311,175 A | 3/1967 | Richey | |
| 3,314,386 A | 4/1967 | Kopaska | |
| 3,324,955 A | 6/1967 | Perold | |
| 3,448,814 A | 6/1969 | Bentley et al. | |
| 3,477,149 A | 11/1969 | Wagner | |
| 3,714,992 A | 2/1973 | Meier | |
| 3,724,557 A | 4/1973 | Boschung et al. | |
| 3,812,919 A | 5/1974 | Baughman et al. | |
| 3,926,262 A | 12/1975 | Brooks | |
| 4,176,477 A | 12/1979 | Farden | |
| 4,186,805 A | 2/1980 | Repski | |
| 4,217,962 A | 8/1980 | Schaefer | |
| 4,220,211 A | 9/1980 | Hake | |
| 4,261,115 A | 4/1981 | Chittenden | |
| 4,294,181 A | 10/1981 | Smith | |
| 4,320,988 A * | 3/1982 | Seal | E02F 3/7631 172/393 |
| 4,356,644 A * | 11/1982 | Harkness | A01G 23/06 172/448 |
| 4,390,071 A | 6/1983 | Wright | |
| 4,393,943 A | 7/1983 | Andersson | |
| 4,436,040 A | 3/1984 | Chumley | |
| 4,553,608 A | 11/1985 | Miskin | |
| 4,554,977 A | 11/1985 | Vachon | |
| 4,585,073 A | 4/1986 | Mayeda et al. | |
| 4,709,492 A | 12/1987 | Watson | |
| 4,753,297 A | 6/1988 | Mayeda et al. | |
| 4,858,698 A | 8/1989 | Williamson et al. | |
| 4,898,247 A | 2/1990 | Springfield | |
| 4,909,335 A | 3/1990 | Walt, Jr. | |
| 4,988,294 A | 1/1991 | DuBe et al. | |
| 5,140,763 A | 8/1992 | Nichols, IV | |
| 5,285,854 A | 2/1994 | Thacker et al. | |
| 5,409,068 A | 4/1995 | Hake et al. | |
| 5,515,625 A | 5/1996 | Keigley | |
| 5,535,832 A | 7/1996 | Benoit | |
| 5,769,171 A | 6/1998 | Newman, IV | |
| 5,794,714 A | 8/1998 | Brown | |
| 5,806,605 A | 9/1998 | Keigley | |
| 5,833,011 A | 11/1998 | Boertlein | |
| 5,833,012 A | 11/1998 | Pierce et al. | |
| 5,881,821 A | 3/1999 | Noonan et al. | |
| 5,988,294 A | 11/1999 | Hubscher | |
| 6,257,342 B1 | 7/2001 | Szatko | |
| 6,578,642 B2 | 6/2003 | Cox et al. | |
| 6,615,929 B2 | 9/2003 | Heckendorf | |
| 6,739,404 B2 | 5/2004 | Keigley | |
| 7,048,069 B1 | 5/2006 | Bollich | |
| 7,063,166 B1 | 6/2006 | Grosberg | |
| 7,401,657 B2 * | 7/2008 | Huber | A01B 31/00 172/395 |
| 7,478,682 B1 | 1/2009 | Keigley | |
| 7,540,331 B1 | 6/2009 | Keigley | |
| 7,543,401 B2 | 6/2009 | Hughes | |
| 7,730,641 B2 | 6/2010 | Ruuska | |
| 2004/0050564 A1 | 3/2004 | Wilson | |
| 2005/0150668 A1 * | 7/2005 | Williamson | A01B 31/00 172/297 |
| 2008/0011496 A1 * | 1/2008 | Garrison et al. | A01B 35/08 172/398 |

\* cited by examiner

IMPLEMENT AND METHOD FOR PREPARING AND MAINTAINING DIRT ARENA FOOTING

CROSS REFERENCE TO RELATED APPLICATIONS

This application is a continuation of application Ser. No. 13/158,760, filed on Jun. 13, 2011 which is a continuation-in-part of application Ser. No. 12/248,974, filed Oct. 10, 2008, which claims the filing date of provisional patent application 60/978,869, filed Oct. 10, 2007 and which is a continuation of application Ser. No. 11/539,065, filed Oct. 5, 2006 and of application Ser. No. 11/445,500, filed Jun. 1, 2006. The present application claims priority to and the benefit of all of the aforementioned applications. The disclosures of each the aforementioned applications are hereby incorporated by reference.

BACKGROUND OF THE INVENTION

1. Field of the Invention

This invention relates to implements for preparing the soil and, more particularly, to an implement and method for improving and maintaining dirt arena footing.

2. Description of the Prior Art

At equine events it is important that the underlying soil upon which the horses perform is prepared properly. A powdered mixture of loosened soil several inches thick is desired with the underlying base of the soil being relatively smooth without any form of a ridged profile. In this manner, the animal may have a firm footing, especially in cases where it's desirable for a horse to stop, slide, spin, and/or turn. Otherwise, serious injury can result to the animal's hoofs or tendons. As horse breeders select longer and thinner legs as preferable traits in equine animals and the direct correlation between firm footing and performance is better understood, this problem has become one of urgent focus.

Some tow-behind implements and methods have been provided for preparing the ground, but arena drags heretofore available use some form of loosening teeth to attempt to soften the arena floor. These prior implements include perpendicular spring-loaded shovels, S tines, chain harrow teeth, ripping or scarifying teeth, and grooming rods, all of which leave potentially injurious ridges in the footing material and/or base. Additionally, to accomplish the desired result, numerous passes over the same path using different corresponding tools may be necessary. This can take significant amounts of time before obtaining optimal footing.

It also has been observed that prior soil loosening apparatus and methods for the purposes set forth above work the soil from the top-down. Inasmuch as the depth of the soil worked cannot always be determined using top-down methods, soil grade depths that are preferably left undisturbed are, instead, often violated. When using previous soil working implements, the scarifying members as ripping teeth, for example, not only leave deep rooted ridges in the underlying base of the soil, which provides an uneven surface having the capacity to injure, but devices that work the soil from the top down fail to sufficiently flocculate the desired amount of powdered mixture of soil for forming a thick cushion on top of the base.

Thus, there remains a need for a new soil working implement and method for optimally preparing and maintaining the footing material of a dirt arena. The present invention is directed toward meeting this need.

SUMMARY OF THE INVENTION

In the broader aspects, the invention provides an implement for preparing and maintaining the ground surface of a dirt arena for optimal footing by equine animals. The ground includes at least a compact base having a top surface and a lesser compact footing on top of the base. The implement includes a frame having a front portion, a central portion, and a rear portion. The frame is adapted for towing behind a vehicle along a path. Wheels are mounted for rotation directly to the frame; and the frame carries tools for engagement with the ground.

In one aspect, a cleaving blade is connected to the rear portion of the frame by a tool support, which securely connects the cleaving blade at predetermined heights.

In another aspect, the blade has a front shaving edge for shaving the top surface of the base and a rear compressing edge for compressing the top surface of the base.

In another aspect, the cleaving blade is straight and extends across the width of the frame so as to maximize the drag displaced on the frame during use of the blade. The compressing force of the compressing action of the blade is optimal as a result.

In yet another aspect, the tools include a front leveling blade for pushing ground to fill indentions to form a level surface so that the wheels provide optimal stabilization of the frame during operation of the blade. A rear comb may also be adjustably attached to the rear portion of the frame for flocculating the ground to produce a smooth cushioning footing on top of the base.

In still another aspect, the blade has a cross section shaped so as to define a portion between the front edge and the rear edge. The portion includes an underneath surface, and the underneath surface does not contact the top surface of the base when the front shaving edge or the rear compressing edge or both the front shaving edge and the rear compressing edge is (or are) in contact with the top surface of the base during operation of the implement.

One object of the present invention is to provide an improved soil working implement capable of slicing, lifting, and aerating the footing of a dirt arena to produce a smooth solid compressed base without ridges and with a flocculated cushioning grade on top of the base. It is also desirable that such an implement achieve such results upon a single pass of the tractor. Related objects and advantages of the invention will be apparent from the following description.

BRIEF DESCRIPTION OF THE DRAWINGS

The details of the invention, both as to its structure and operation, may be obtained by a review of the accompanying drawings, in which.

DETAILED DESCRIPTION OF INVENTION

Figure 1:
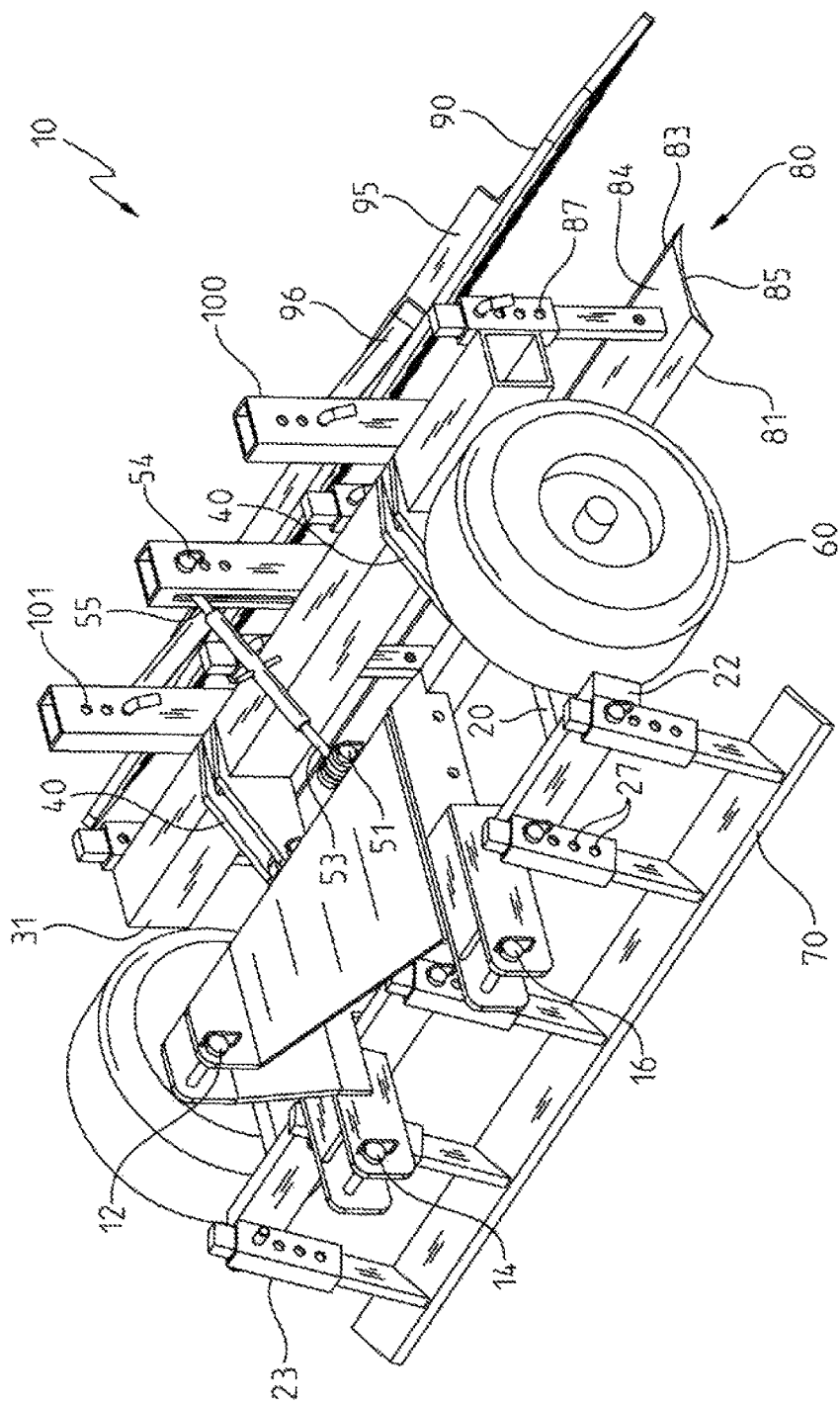
FIG. 1 is an isometric view of an embodiment of the soil working implement of the invention.

For the purposes of promoting an understanding of the principles of the invention, specific embodiments have been described. It should nevertheless be understood that the description is intended to be illustrative and not restrictive in character, and that no limitation of the scope of the invention is intended. Any alterations and further modifications in the described components, elements, processes, or devices, and any further applications of the principles of the invention as described herein, are contemplated as would normally occur to one skilled in the art to which the invention relates.

An implement 10 for preparing the ground surface is shown in the drawings. The implement 10 includes a main frame 20 having a front portion 22, a central portion 24, and a rear portion 26. Frame 10 may include a three point hitch, shown in FIG. 2, or another known hitch device for attaching frame 10 to a vehicle 5. The exemplary three point hitch illustrated is pivotally connected to implement 10 by actuators, which may be manual such as actuator 15 connected at pivot connection 12 or hydraulic cylinders 17 as connected at pivot connections 14 and 16 so the frame 20 may be adjusted in relation to the ground and towed behind vehicle 5 along a path. The three point hitch is preferably capable of lifting frame 20, including wheels 60, completely off the ground for transporting implement 10 between work sites.

Referring to the figures, in one embodiment, the front portion 22 of frame 20 includes front tool supports 23 formed of tubular steel with bores 27 extending through them for receiving pins to secure leveling blade 70 at the desired height. Leveling blade 70 has elongate arms 76, which are apertured for alignment with bores 27 and securing with pins. In the exemplary embodiment, blade 70 spans beyond the width of frame 20 and past the distance defined between the outside surfaces of wheels 60. Wheels 60 are mounted for rotation, directly or indirectly, to central portion 24 of frame 20. Wheels 60 may be foam-filled or, preferably, air-filled rubber tires with sealed bearings to optimally stabilize the frame and prevent bouncing and/or swaying of frame 20. More preferably, tires measuring between about sixteen and twenty inches in diameter are preferred for optimal stabilization of a steel frame 10 measuring approximately four feet in length and six to ten feet in width and weighing between about 500 and 1,000 pounds.

Figure 4:
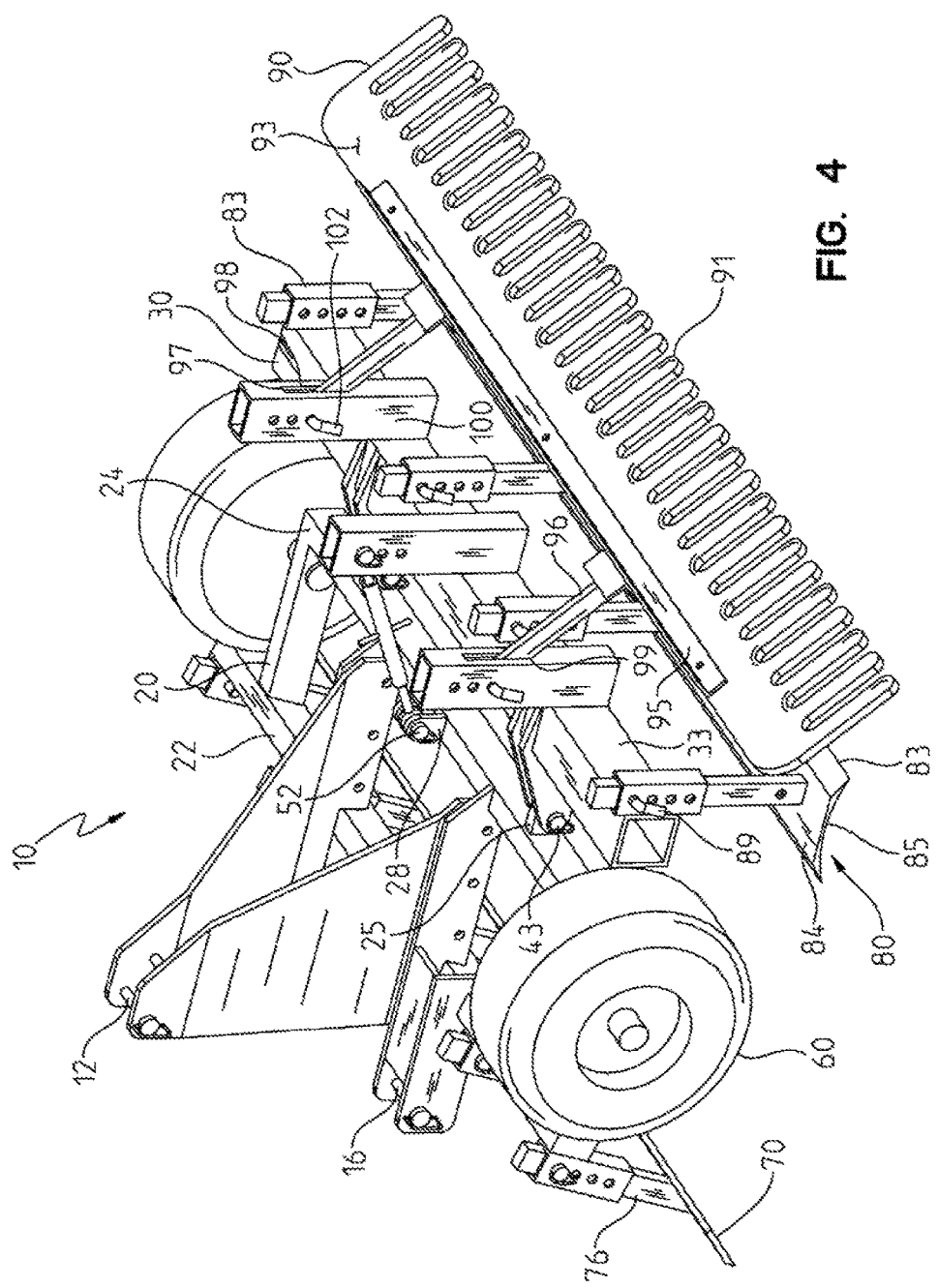
FIG. 4 is a rear perspective view of an embodiment of the soil working implement of the invention.

In the embodiment shown, central portion 24 of frame 20 includes rearwardly extending mounting blocks 25. Mounting blocks have apertures for receiving a pin, which joins winged support member mounts 40 at support member pivots 43, as shown in FIG. 4. This enables the rear portion of the frame (and any tools carried thereby) to adjust to sudden changes in operation that may or may not be intended. Hitting a rock is an example. Behind wheels 60, the rear portion 26 of the frame includes a support member 30 having a front side 31 and a rear side 33. The support member includes a tool support for securely connecting the cleaving blade 80 at predetermined heights. Cleaving blade 80 is a substantial aspect of the invention.

Figure 3:
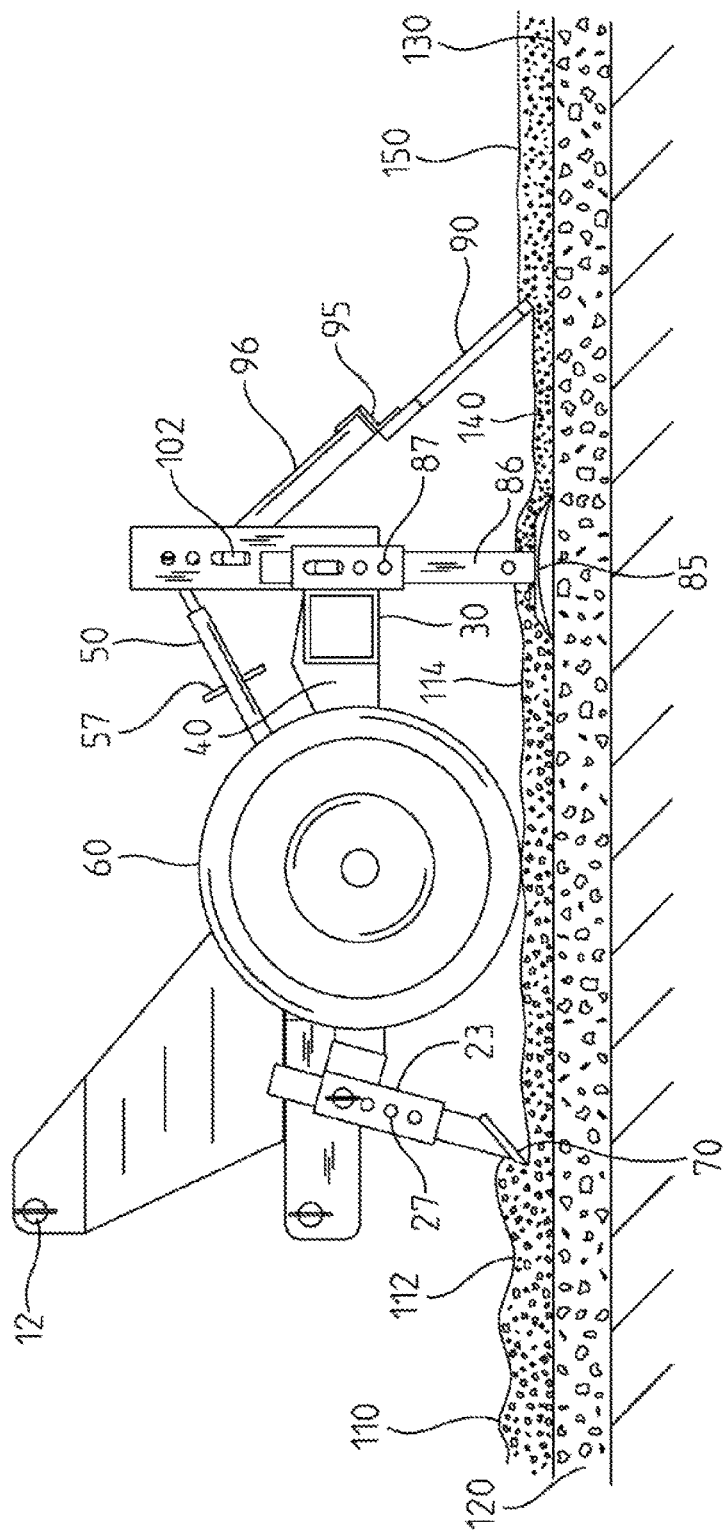
FIG. 3 is a side view of an embodiment of the soil working implement in a working position showing the operation of the cleaving blade.

In the embodiment shown, the rear side 33 includes rear tool supports 83 that securely connect the cleaving blade 80 at predetermined heights. In that embodiment, the heights are located in a plan that is transverse to the top surface of the base. In another embodiment (not shown), front tool supports 23 connect in cleaving blade 80 to the front portion of the frame. In that embodiment, blade 80 functions substantially the same manner as described below. The tool supports shown at 83 (and 23) are formed of tubular steel with bores 87 extending through them for receiving pins 89 to secure the arms 86, which include bores for aligning with bores 87 of cleaving blade 80 at the desired height so the blade can cleave the soil at any one of at least two levels below the ground surface 110. In one embodiment, the cleaving blade 80 has a beveled front so that when oriented as depicted in FIG. 3 the blade 80 cuts and lifts the soil so that the soil is aerated before it's deposited on top of the base 120.

In one embodiment, the cleaving blade 80 includes a front shaving edge 81 for shaving the top surface 130 of base 120. In the same or another embodiment, the cleaving blade 80 includes a rear compressing edge 83 for compressing the top surface 130 of base 120. The profile of the cleaving blade should be such that it functions to shave on the front and compress at its rear edge accordingly. In at least one embodiment, the cleaving blade has a cross section shaped so as to define a portion 84 between the front edge 81 and rear edge 83, as best depicted in FIGS. 1 and 4. Portion 84 includes an underneath surface 85. In that embodiment, the underneath surface 85 does not contact the top surface 130 of the base 120 when the front shaving edge 81 or the rear compressing edge 83 or both 81, 83 is/are in contact with the top surface 130 of the base 120 during operation of the implement.

Unlike prior blades such as the ones described in U.S. Pat. Nos. 4,909,335; 5,285,854; and 599,093, in addition to a cutting function, the inventive blade 80 has a compressing function, which "finishes" the top surface 130 unlike heretofore possible. In one embodiment, the cleaving blade 80 is straight and extends across the width of the frame so as to maximize the drag force displaced on the frame during use of the blade 80. The compressing force delivered to the top surface 130 of the base 120 by way of the compressing edge 83 is optimal as a result. In at least one embodiment, blade 80 may be a pair of blades in side-by-side alignment so as to function as a continuous blade extending substantially across the width of the frame 20. The combination of the straight shape of the blade 80 (as opposed to pointed, curved, stepped, or other) and the placement, type and size of wheels 60 ensures optimal stabilization of the frame and hence optimal control of the cleaving (and compressing) blade 80. The top surface 130 of the base 120 may thus be shaved and compressed in one pass as heretofore not possible.

Those skilled in the art may intuit other embodiments and designs for implements employing applicant's novel aspects. One exemplary tool may include a comb. In the embodiment shown in the figures, a comb 90 having an upper portion 93 with downwardly extending tines 91 is removably secured to the rear side 33 of the support member 30. A coupling member 95 with elongated coupling arms 96 is secured by known means to the upper portion 93 of the comb. The arms 96 include ends with bores extending through them. A pair of opposite tubular stock steel members 100 upstanding from the rear side 33 of the support member 30 receives the arms 96. Bores 101 align with the bores (not shown) in the ends of the arms 96 to receive pins 102 so comb 90 is removably and pivotally secured to rear side 33 of support member 30. Comb 90 "floats" on the ground surface as a result at any one of a plurality of angles relative to the ground surface between an upper position and a lower position defined, respectively, by the top and bottom surfaces 97, 99 of slot 98. In this embodiment, the particular angle at which comb 90 contacts the ground surface is determined by the orientation of support member 30 on support member pivot 43 (FIG. 4), which may be adjusted by an adjustable link 50 connected between the frame 20 and the support member 30, as described below.

Manually operated adjustable link 50 is for adjusting the orientation of the member 30 relative to the central portion 24 at support member pivots 43. The link 50 may be adapted for remote electromechanical operation as known in the art.

In the example illustrated, link 50 includes a front portion 53 connected to ears 28 of the central portion 24 of the frame at a first pivot 52 by pin 51. With reference to all of the figures, the rear portion 55 of the link is pivotally connected at second pivot 54 in a similar manner as the front portion to a central tubular steel member 100 upstanding from the rear side 33 of the support member 30. Rotating handle 57 moves the central portion 50 to and fro along the longitudinal axis of link 50, which adjusts the orientation of the support member 30 on support member pivot 43. In some embodiments, at least part of the control of the shaving and/or compressing functions of the blade 80 are achieved as the profile angle of blade 80 changes relative to top surface 130 of base 120. In the same or other embodiment(s), manual (or automatic) adjustment within tool supports 83 control the shaving and or compressing functions of the blade 80.

Figure 2:
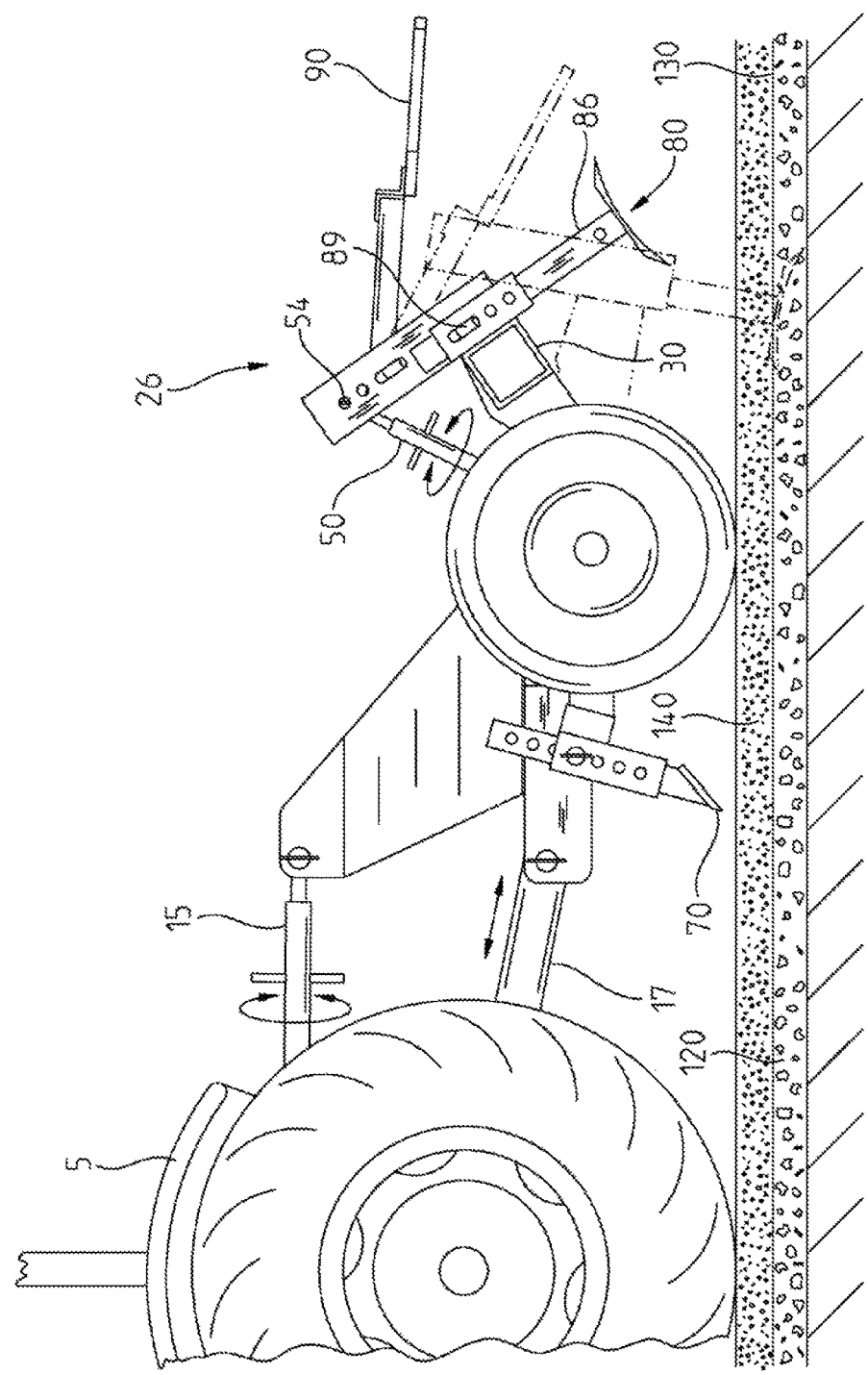
FIG. 2 is a side view of an embodiment of the soil working implement coupled to a tractor showing the ranges of motion of the comb and the support member.

In operation, with reference to FIGS. 2 and 3, a method of preparing the ground surface 110 by the exemplary towing implement 10 along a path behind a vehicle 5 will be described. The ground includes at least base 120 with top surface 130 and footing 140 on top of the base. The frame 20 may be stabilized by producing a substantially level grade surface 114 upon which the frame supporting and stabilizing wheels 60 may travel. The ground surface 110 is pushed with leveling blade 70, which spans beyond the width of the outer sides of the wheels 60 to fill any indentions 112. The surface upon which wheels 60 contact the ground surface, therefore, is a substantially level grade surface 114, which prevents the frame from bouncing and swaying while in tow.

Next, in one step, the cleaving blade 80 shaves, lifts and aerates soil from the top surface 130 up over the portion 84 of the blade 80. Blade 80 may be positioned as shown in FIG. 3 so that both the front shaving edge 81 and the rear compressing edge 83 are, respectively, shaving and/or compressing the top surface 130 of base 120. Adjustable link 50 may be rotated as described above to control the profile angle of the blade 80. Referring to FIGS. 2 and 3, upon rotation of handle 57, support member 30 and thus cleaving blade 80 can be oriented upon pivot 43. Blade 80 can shave the top surface 130 to free up footing that has been compacted thereon by animal hooves, or the shaving edge 81 may be used to slightly shave the base 120 below the top surface 130 to define a new top surface (not shown). Optionally, or in combination with the shaving edge 81 of blade 80, the compressing edge 83 of blade 80 can compress the top surface accordingly.

In one embodiment, the cleaving blade 80 is straight and extends across the width of the frame so as to maximize the drag force displaced on the frame during use of the blade 80. The compressing force delivered to the top surface 130 of the base 120 by way of the compressing edge 83 is optimal as a result. In at least one embodiment, blade 80 may be a pair of blades in side-by-side alignment so as to function as a continuous blade extending substantially across the width of the frame 20. The combination of the straight shape of the blade 80 (as opposed to pointed, curved, stepped, or other) and the placement, type and size of wheels 60 ensures optimal stabilization of the frame and hence optimal control of the cleaving (and compressing) blade 80. The top surface 130 of the base 120 may thus be shaved and compressed in one pass as heretofore not possible.

The footing 140 is then optionally flocculated by comb 90 to produce a substantially level finished ground surface having a substantially smooth solid base 120 with a flocculated cushioning grade 150 on top of the base. Comb 90 floats upon the ground surface at an angle, as described above. The described footing surface is much improved over that which has been available before the novel implement 10, and the results may be obtained with a single pass of the tractor, which saves time and labor.

While the invention has been illustrated and described in detail in the drawings and foregoing description, the same is to be considered illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

The invention claimed is:

1. A method comprising:
    positioning a ground working apparatus on an area of ground to be worked, the apparatus including a frame having a width, a length and a height, a plurality of ground contacting members rotatably coupled with the frame at spaced apart locations along the width of the frame, and a cleaving blade coupled with the frame, the cleaving blade including a shaving edge and a compressing edge extending along the width of the frame, a length extending from the shaving edge to the compressing edge, a width extending along the width of the frame, and a height extending from an upper surface to a lower surface, the width being greater than the length, and the height being less than the width and the length;
    with the frame supported a spaced apart distance above the area of ground to be worked, operating an actuator to move the cleaving blade from a first position in which the cleaving blade is positioned above the area of ground to a second position in which the cleaving blade is positioned below the area of ground with the upper surface facing upward toward the frame and being positioned at a first angle relative to a plane that is parallel with an upper surface of the area of ground, the first angle positioning the upper surface of the cleaving blade parallel to said plane and positioning the shaving edge and the compressing edge an equal distance from said plane; and
    moving the apparatus along the area of ground to be worked such that the shaving edge shaves a portion of the ground which passes over the cleaving blade and the compressing edge compresses a portion of the ground which has passed under the shaving edge.

2. The method of claim 1 comprising operating the actuator to move the cleaving blade to a third position in which the cleaving blade is positioned below the ground with the upper surface facing upward toward the frame and being positioned at a second angle relative to said plane.

3. The method of claim 2 comprising moving the apparatus along the area of ground to be worked with the cleaving blade in the third position such that the shaving edge shaves a portion of the ground which passes over the cleaving blade and the compressing edge compresses a portion of the ground which has passed under the shaving edge, and the compression by the compression edge when the cleaving blade is in the third position is greater than when the cleaving blade is in the second position.

4. The method of claim 1 wherein the ground working apparatus includes a leveling blade coupled with the frame and extending along the width of the frame, the method comprising positioning the leveling blade to extend into the ground surface to a second depth, the second depth being less than the depth of the cleaving blade below the ground surface when the cleaving blade is in the second position, wherein during the act of moving the leveling blade levels the ground at a location in advance of the cleaving blade.

5. The method of claim 1 wherein the area of ground includes a lesser compact footing on top of a compact base, and wherein during the act of moving, the shaving edge shaves a portion of the compact base, the shaved portion of the compact base passes over the cleaving blade, and the compressing edge compresses the shaved portion of the compact base.

6. The method of claim 1 wherein when the cleaving blade is in the third position the cleaving blade positioned at an angle such that the compressing edge of the cleaving blade is positioned at a greater depth below the ground than the shaving edge.

7. The method of claim 6 wherein when the cleaving blade is in the second position the cleaving blade positioned at an angle such that the compressing edge of the cleaving blade is positioned at a greater depth below the ground than the shaving edge.

8. The method of claim 7 comprising adjusting the distance of the cleaving blade relative to the frame without use of a tool by removing a plurality of coupling members which extend through and couple a support member with a plurality of arms extending from the cleaving blade, moving the plurality of arms relative to the support member, and inserting the plurality of coupling members to extend through and couple the support member with a plurality of arms.

\* \* \* \* \*